(12) United States Patent
O'Neil

(10) Patent No.: US 7,404,322 B1
(45) Date of Patent: *Jul. 29, 2008

(54) ALTIMETER WITH KOLSMAN WINDOW CLARIFIER

(76) Inventor: George J. O'Neil, 14 Rock Garden Ct., #1, Bloomington, IL (US) 61704

( * ) Notice: Subject to any disclaimer, the term of this patent is extended or adjusted under 35 U.S.C. 154(b) by 0 days.

This patent is subject to a terminal disclaimer.

(21) Appl. No.: 11/855,634

(22) Filed: Sep. 14, 2007

Related U.S. Application Data

(63) Continuation of application No. 11/294,619, filed on Dec. 5, 2005, now Pat. No. 7,313,962.

(51) Int. Cl.
*G01L 7/20* (2006.01)
(52) U.S. Cl. ........................................... 73/384
(58) Field of Classification Search .................. 73/700, 73/384
See application file for complete search history.

(56) References Cited

U.S. PATENT DOCUMENTS

| | | | |
|---|---|---|---|
| 2,465,775 A | 3/1949 | White | |
| 2,718,783 A * | 9/1955 | Anastasia | 73/179 |
| 2,832,220 A | 4/1958 | Logie | |
| 3,191,439 A * | 6/1965 | Johanson | 73/387 |
| 3,283,582 A * | 11/1966 | Hezel | 73/384 |
| 3,685,360 A | 8/1972 | Raznov | |
| 3,915,007 A | 10/1975 | Johanson et al. | |
| 3,936,797 A * | 2/1976 | Andresen, Jr. | 340/977 |
| 3,978,730 A | 9/1976 | Anderson | |
| 4,020,787 A | 5/1977 | Castro et al. | |
| 5,178,010 A * | 1/1993 | Holzel | 73/384 |

\* cited by examiner

*Primary Examiner*—Andre J Allen
(74) *Attorney, Agent, or Firm*—Renner, Otto, Boisselle & Sklar, LLP

(57) ABSTRACT

An altimeter having a magnifying element configured to magnify a barometric scale for use in setting the altimeter to a local barometric pressure. The magnifying element can be a plano-convex lens positioned on a transparent cover of the altimeter over the barometric scale. The lens can be adhered to the transparent cover with an adhesive or can be formed as part of the transparent cover. In one embodiment, the magnifying element is included as part of a cover that can be secured to an altimeter.

12 Claims, 2 Drawing Sheets

ALTIMETER WITH KOLSMAN WINDOW CLARIFIER

This application is a continuation of U.S. patent application Ser. No. 11/294,619, filed on Dec. 5, 2005 now U.S. Pat. No. 7,313,962, which is hereby incorporated herein by reference in its entirety.

FIELD OF THE INVENTION

The present invention relates generally to aviation instruments. More particularly, the invention relates to altimeters for use in general aviation.

BACKGROUND OF THE INVENTION

General aviation aircraft are typically equipped with one or more altimeters that determine altitude by measuring changes in barometric pressure. Changes in barometric pressure are determined by a diaphragm that is responsive to atmospheric pressure. The response of the diaphragm to changes in barometric pressure is used to drive an indicator, such as a needle, relative to a scale on a dial face to thereby indicate altitude.

In order to provide accurate altitude readings, an altimeter must be adjusted to the local barometric pressure on the ground at a given location. To adjust the altimeter to the local barometric pressure, a small window in the dial face, referred to as a Kolsman window, exposes a barometric pressure scale. A knob is provided for adjusting the barometric pressure scale to the desired setting. By turning the knob one way or the other, the desired barometric pressure can be aligned with a mark on the dial face thereby setting the altimeter.

The altimeter should be adjusted to the local barometric pressure at takeoff and landing. For example, prior to takeoff a pilot will typically receive an altimeter setting (the local barometric pressure) over the radio from a ground controller and adjust the altimeter accordingly. Once set to the local barometric pressure, the altimeter should indicate the elevation of the airfield provided that the aircraft is at the same reference level used to establish the altimeter setting. Once in flight, the pilot will periodically obtain current altimeter settings en route, and adjust the altimeter accordingly. Periodically adjusting the altimeter is important, for example, when flying from an area of high pressure into an area of low pressure. If the altimeter is not adjusted to the new lower local barometric pressure, the aircraft will be closer to the surface than the altimeter indicates. In this regards, an inch change in the altimeter setting equals approximately 1,000 feet of altitude. When approaching an airfield for landing, the pilot will again receive a local altimeter setting and adjust the altimeter to the local barometric pressure at the landing airfield.

Adjusting an altimeter to the local barometric pressure is critical to ensuring the most accurate altitude reading possible. Indeed, in the history of aviation, many mishaps have occurred due to inaccurate and/or improperly adjusted altimeters. Many factors can contribute to a pilot setting an altimeter inaccurately. For example, the pilot may misunderstand the altimeter setting dictated by the ground controller over the radio and thereby set the altimeter to an incorrect barometric pressure. The pilot may inadvertently adjust the altimeter to a inaccurate barometric pressure by misreading the barometric pressure scale through the Kolsman window. Further, while in flight, turbulence may prevent the pilot from accurately reading and/or adjusting the altimeter to the proper pressure.

For pilots with any visual impairment due to age, such as myopia or cycloplegia, difficulty adjusting the altimeter is further compounded, particularly in turbulence or in low light conditions. As a large percentage of general aviation pilots are over the age of 40, the age at which cyclopegia commonly starts occurring, difficulty in viewing the Kolsman window is a prevalent problem. As such, a long felt yet unresolved need exists for an altimeter having a Kolsman window that is easy to read.

SUMMARY OF THE INVENTION

The present invention provides an altimeter having an aperture (Kolsman window) that is magnified to enhance viewing and aid in setting the altimeter. The Kolsman window can be magnified by a plano-convex lens that magnifies the barometric scale.

In accordance with another aspect of the present invention an altimeter is provided comprising a dial face, an aperture in the dial face for viewing a barometric pressure scale for setting a barometric pressure, a transparent cover covering the dial face, and a magnifying element positioned to magnify at least part the barometric scale.

In accordance with another aspect of the invention, an altimeter is provided comprising a dial face having numbers from zero to nine spaced at equal intervals around the circumference of the dial face, a Kolsman window in the dial face at the 3 o'clock position, a barometric scale viewable through the Kolsman window, a Kolsman window adjuster for setting the barometric pressure in the Kolsman window, a transparent cover enclosing the dial face, and a plano-convex lens secured to the transparent cover over the Kolsman window. The plano-convex lens is secured to the transparent cover with an adhesive, particularly Norland Optical Adhesive Number 61.

According to yet another aspect of the invention, a magnifier for an altimeter is provided comprising a mount portion and a magnifying element. The mount portion is configured to secure the magnifying element relative to the altimeter and the magnifying element is at least partially supported by the mount portion.

Further features of the invention will become apparent from the following detailed description when considered in conjunction with the drawings.

DETAILED DESCRIPTION

Figure 1:
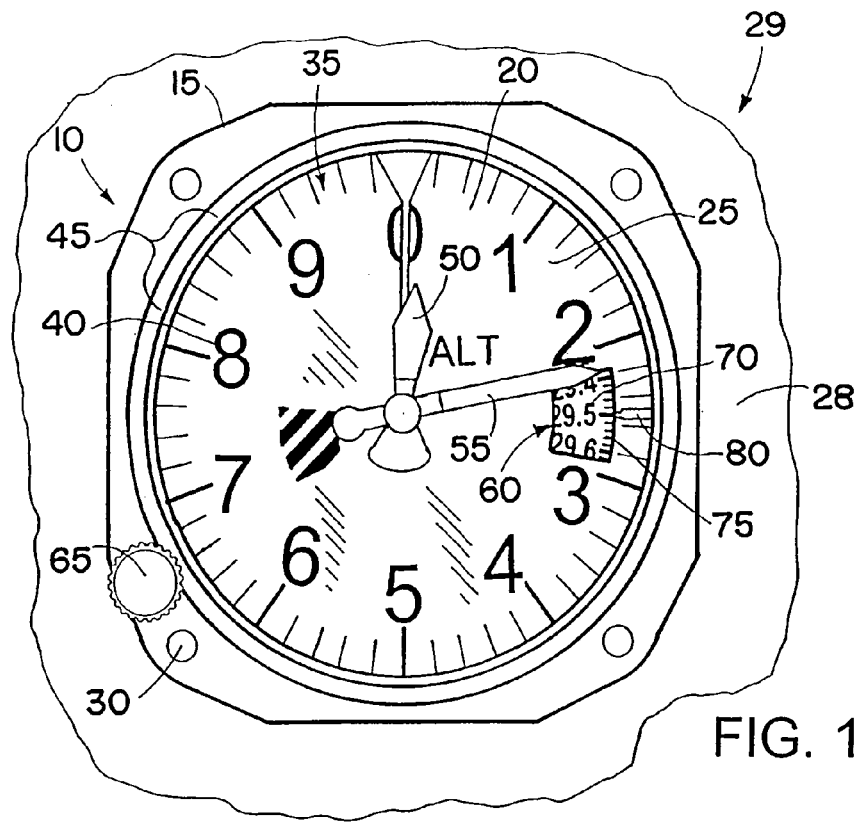
FIG. 1 is an overhead view of an exemplary altimeter.

Referring now to the drawings in detail, and initially to FIG. 1, an exemplary altimeter 10 is shown. The altimeter 10 includes a housing 15 containing the working components (not shown) of the altimeter 10. A generally planar transparent cover 20, which can be a crystal, covers a dial face 25. The transparent cover 20 can be made of glass or plastic or any other suitable material as desired. As is typical, the altimeter 10 can be installed in a dash 28 of a cockpit of a plane, shown generally by reference numeral 29, with the housing 15 and/or transparent cover 20 generally flush with the surface of the dash 28. Suitable mounting holes 30 are provided in the housing 15 for securing the altimeter 10 to the dash.

The altimeter 10 includes graduations 35 on the dial face 25 and numbers 40 (zero to nine in the FIGS.). Fine graduation marks 45 between the numbers 35 denote altitude in twenty foot increments. A short needle 50 is provided for indicating altitude in thousands of feet, while a long needle 55 is provided for indicating altitude in hundreds of feet at ten foot increments (e.g., the number 1 corresponds to 100 feet altitude). Thus, as shown in FIG. 1, the altimeter 10 indicates an altitude of approximately 160 feet.

An aperture 60, herein referred to as a window or Kolsman window, and a knob 65 are provided for adjusting the altimeter 10 to a desired barometric pressure. A barometric scale 70 is visible in the window 60. The barometric pressure scale 70 displays barometric pressure in fine markings 75 to hundredths of inches of mercury (Hg). A calibration mark 80 is provided for aligning a desired barometric pressure therewith. The knob 65 can be rotated clockwise or counterclockwise to adjust the altimeter 10 to the desired pressure. As shown, the altimeter 10 is set to a barometric pressure of approximately 29.50 inches.

Setting the altimeter 10 is performed by rotating the knob 65 clockwise or counterclockwise until the desired barometric pressure is aligned with the calibration mark 80. As will be appreciated, the fine markings 75 are closely spaced making fine adjustment of the altimeter difficult to achieve. Further, if trying to adjust the altimeter in turbulence or low light conditions, accurate adjustment of the barometric pressure scale 70 can be difficult.

Figure 2:
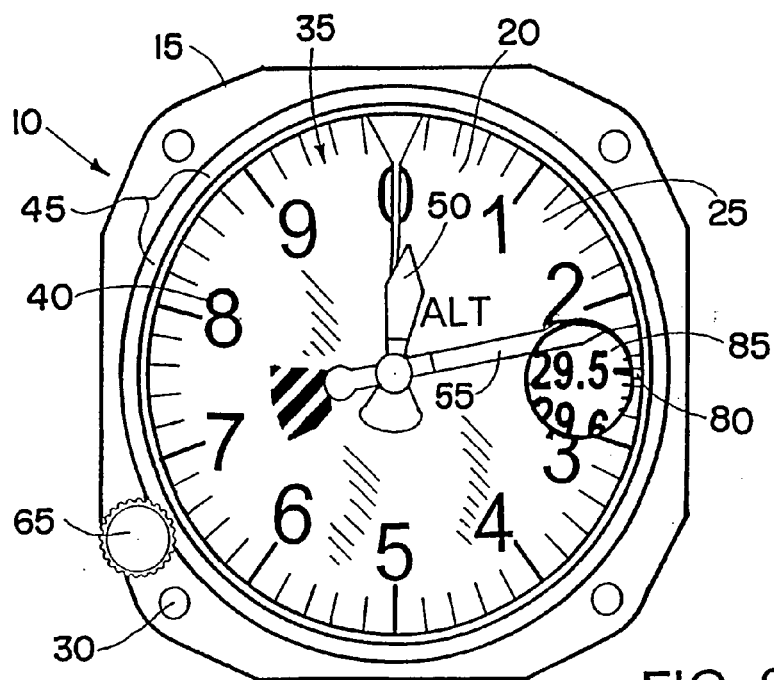
FIG. 2 is an overhead view of an exemplary altimeter in accordance with the present invention.

Turning to FIG. 2, an altimeter 10 in accordance with the present invention is shown including a magnifying element 85. The magnifying element in the illustrated embodiment is a plano-convex lens magnifying element 85 which is flat on a first side and convex on a second side, however, other types of lenses can also be used. The plano-convex lens magnifying element 85 is affixed to the transparent cover 20 over the Kolsman window 60. The plano-convex lens magnifying element 85 can be made of any suitable material. By way of example, military grade BK7 glass can be used.

The diameter of the plano-convex lens magnifying element 85 can be selected as appropriate for a given altimeter 10. In general, the diameter will be of a size so as to make the small numbers and graduations in the Kolsman window 60 readable at arms length, without adversely impacting the ability to read the long arm 55 of the altimeter 10 or to see the adjacent numbers 40 (e.g., the 2 and 3 hundred foot numbers in the FIGS. between which the Kolsman window 60 is located). As evident in FIG. 2, the plano-convex lens magnifying element 85 does not interfere with viewing any of the numbers and/or graduations on the dial face 25. However, it will be appreciated that other dimensions for the plano-convex lens 85 are possible, and that depending on the dimensions of the plano-convex lens magnifying element 85, some of the numbers and/or graduations on the dial face may be covered by the plano-convex lens magnifying element 85.

The plano-convex lens magnifying element 85 can be attached to the transparent cover 20 in any suitable manner. By way of example, the plano-convex lens magnifying element 85 can be bonded to the altimeter transparent cover 20 with an adhesive, such as Norland Optical Adhesive Number 61. As will be appreciated, other adhesives can be used. Norland 61 is a clear, colorless, liquid photopolymer that will cure when exposed to ultraviolet light (365 nm). NORLAND 61 meets Federal Specification Mil-A-3920C for optical adhesives and is approved for use on all government contracts specifying such adhesives. NORLAND 61 is often used for bonding lenses, prisms and mirrors for military, aerospace and commercial optics.

The adhesive is a clear one part adhesive that contains no solvent. When exposed to ultraviolet light, it gels in seconds and in minutes gives a tough, resilient bond. This allows very precise placement of the plano-convex lens magnifying element 85 on the altimeter transparent cover 20 prior to ultraviolet bonding. The cured refractory index of Norland 61 is approximately 1.56, which is similar to the refractory index of BK7 glass (approximately 1.52). Once cured, the adhesive is clear and has little or no refraction or absorption of ambient light and can withstand temperatures from −150 to 125 degrees Celsius. Other physical properties of Norland 61 are as follows: Elongation at Failure (%) 38; Modulus of Elasticity (psi) 150,000; Tensile Strength (psi) 3,000; Hardness—Shore D 85.

The plano-convex lens 85 magnifies the numbers and graduations of the barometric pressure scale 70 in the Kolsman window 60 resulting in a conical visual window radiating outward from the altimeter transparent cover 20 in which the complete contents of the Kolsman window 60 can be viewed.

Other magnifying elements 85 can be used in accordance with the present invention. For example, depending on the application, a fresnel lens can be used. Further, the magnifying element 85 can be formed integrally with the altimeter transparent cover 20, or can be positioned on the dial face 25 rather than on the transparent cover 20.

As will be appreciated, existing altimeters 10 can be used with the present invention. In some instances, retrofitting existing altimeters 10 with a magnifying element 85 in accordance with the present invention may be desired. Such existing altimeters could be removed from service in existing aircraft for modification. Alternatively, existing altimeters could be modified in situ (e.g., a magnifying element could be installed on the altimeter while the altimeter remains installed in an aircraft). In order to facilitate modification of a variety of brands of altimeters, a specific template for placement of the magnifying element 85 can be used for each brand and/or model of altimeter to be modified.

Figure 3:
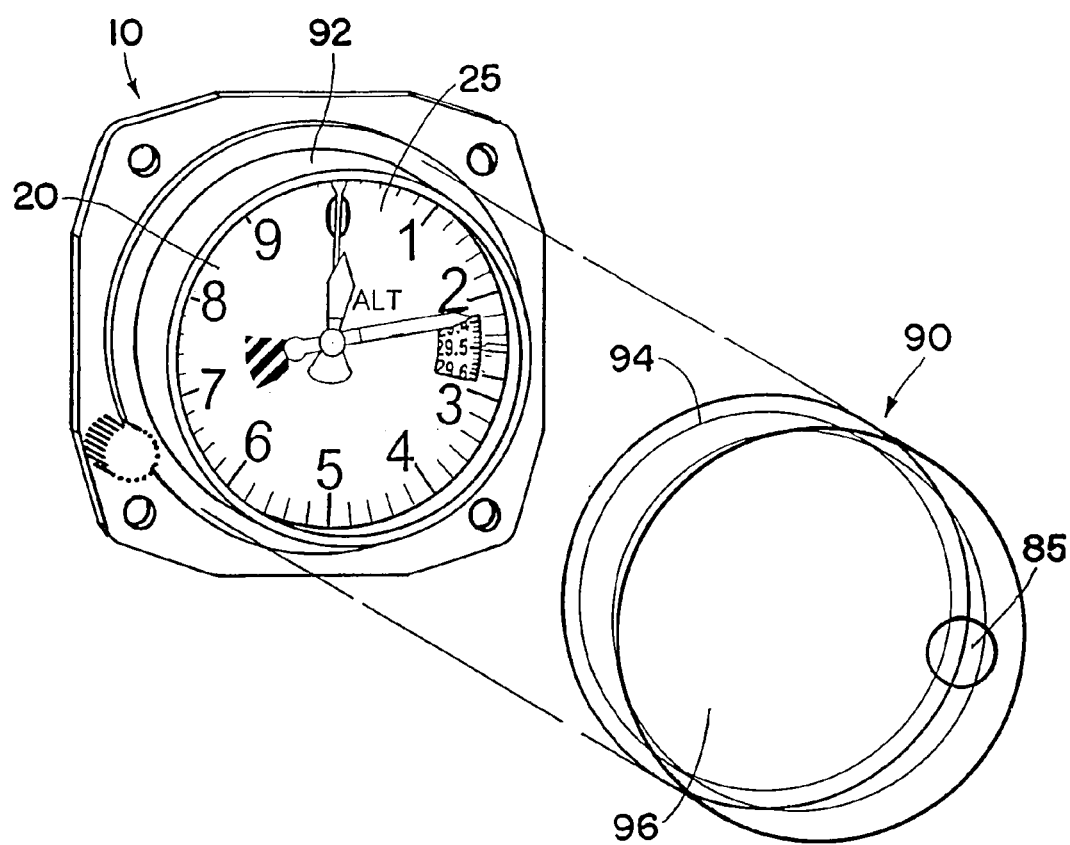
FIG. 3 is an exploded view of an altimeter and a cover in accordance with the present invention.

Further, as seen in FIG. 3, the magnifying element 85 can be provided as part of a cover 90 that can be removably secured to the altimeter 10. In this embodiment, the altimeter 10 has a raised ring-like ridge 92 surrounding the dial face 25 by which the transparent cover 20 is supported. The cover 90 includes a mount portion 94, which may be a ring as shown, generally configured to telescope over the ring-like ridge 92 of the altimeter 10 and thereby frictionally secure the cover 90 relative to the dial face 25. The cover further includes a generally planar transparent element 96 to which the magnifying element 85 is secured. The transparent element 96 is generally a clear plastic or glass material. As will be appreciated, the cover 90 can be rotated relative to the dial face 25 to adjust to position of the magnifying element 85 relative to the dial face 25.

As light passes through a glass substrate, such as the transparent cover 20 or piano-convex lens 85, approximately 4% of the light will be reflected at each surface. This results in a total transmission of only 92% of the incident light. Therefore, the magnifying element 85 can be provided with an anti-reflective coating, such as MgF2, to reduce reflection and thereby enhance visibility of the barometric pressure scale 70 in the Kolsman window 60. Any suitable anti-reflective coating can be used. Applying an anti-reflective coating on each surface of the piano-convex lens magnifying element 85 can increase the throughput of the light and reduce hazards caused by reflections traveling backwards through the lens 85 (e.g., ghost images). Anti-reflective coatings are especially important if the altimeter 10 contains more than one transmitting optical element, such as the transparent cover 20 and the lens 85 of the altimeter 10 in FIGS. 1-3.

An altimeter 10 in accordance with the present invention facilitates adjustment and/or setting of the barometric pressure in the Kolsman window 60 by enlarging and/or clarifying the barometric pressure scale 70. This can permit adjustment of the altimeter 10 at full arms length during turbulence, a task previously difficult to accurately achieve. The increased ease of adjusting the altimeter 10 under wide variety of conditions (e.g., turbulence, low light, etc.) may contribute to minimizing pilot errors in setting the local barometric pressure thereby increasing the overall accuracy of the altimeter.

The location of the Kolsman window in the illustrated embodiments is exemplary and, therefore, it will be appreciated that the Kolsman window can be located in a wide variety of positions. Further, some altimeters have more than one Kolsman window and each Kolsman window can include a magnifying element in accordance with the invention, as desired. By way of example, some altimeters have a first Kolsman window having a barometric scale calibrated in inches of mercury (as illustrated and described herein) and a second Kolsman window calibrated in millibars. The second Kolsman window can be identical in virtually every aspect to the first Kolsman window, but located between the numbers 7 and 8 on the dial face. In accordance with the present invention, each Kolsman window can include a separate magnifying element.

Although the invention has been shown and described with respect to a certain preferred embodiment or embodiments, it is to be understood that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An altimeter comprising:
   a dial face;
   an aperture in the dial face for viewing a barometric pressure scale for setting a barometric pressure;
   a transparent cover over the dial face; and
   a magnifying element positioned to magnify at least part of the barometric pressure scale,
   wherein the magnifying element is a piano-convex lens.

2. An altimeter as set forth in claim 1, wherein the piano-convex lens is affixed to an external surface of the transparent cover over at least a part of the aperture.

3. An altimeter as set forth in claim 2, wherein the piano-convex lens is affixed to the external surface of the transparent cover with an adhesive.

4. An altimeter as set forth in claim 3, wherein the adhesive is Norland Optical Adhesive Number 61.

5. An altimeter comprising:
   a dial face;
   an aperture in the dial face for viewing a barometric pressure scale for setting a barometric pressure;
   a transparent cover over the dial face; and
   a magnifying element positioned to magnify at least part of the barometric pressure scale,
   wherein the magnifying element is a fresnel lens.

6. An altimeter comprising:
   a dial face;
   an aperture in the dial face for viewing a barometric pressure scale for setting a barometric pressure;
   a transparent cover over the dial face; and
   a magnifying element positioned to magnify at least part of the barometric pressure scale,
   wherein the aperture is a Kolsman window.

7. An altimeter as set forth in claim 1, wherein the transparent cover is a plastic crystal.

8. An altimeter as set forth in claim 1, wherein the transparent cover is a glass crystal.

9. An altimeter as set forth in claim 1, wherein the magnifying element is included in a cover that can be removably secured to the altimeter.

10. An altimeter comprising:
    a dial face;
    an aperture in the dial face for viewing a barometric pressure scale for setting a barometric pressure;
    a transparent cover over the dial face; and
    a magnifying element positioned to magnify at least part of the barometric pressure scale,
    further comprising an anti-reflective coating on at least one surface of the magnifying element.

11. An altimeter as set forth in claim 10, wherein the anti-reflective coating is $MgF_2$.

12. An altimeter comprising:
    a dial face;
    an aperture in the dial face for viewing a barometric pressure scale for setting a barometric pressure;
    a transparent cover over the dial face; and
    a magnifying element positioned to magnify at least part of the barometric pressure scale,
    wherein the magnifying element is made of BK7 glass.

* * * * *

UNITED STATES PATENT AND TRADEMARK OFFICE
CERTIFICATE OF CORRECTION

PATENT NO. : 7,404,322 B1  
APPLICATION NO. : 11/855634  
DATED : July 29, 2008  
INVENTOR(S) : George J. O'Neil Page 1 of 1

It is certified that error appears in the above-identified patent and that said Letters Patent is hereby corrected as shown below:

Column 4, line 51, "piano-convex" should read --plano-convex--

Column 4, line 59, "piano-convex" should read --plano-convex--

Column 5, line 52, claim 1, "piano-convex" should read --plano-convex--

Column 6, lines 1-2, claim 2, "piano-convex" should read --plano-convex--

Column 6, lines 4-5, claim 3, "piano-convex" should read --plano-convex--

Signed and Sealed this

Twenty-first Day of October, 2008

JON W. DUDAS  
*Director of the United States Patent and Trademark Office*